(12) United States Patent
Eckler

(10) Patent No.: US 8,989,703 B2
(45) Date of Patent: Mar. 24, 2015

(54) METHODS AND SYSTEMS FOR ELECTRONIC DEVICE STATUS EXCHANGE

(71) Applicant: Rogers Communications Inc., Toronto (CA)

(72) Inventor: Michael Eckler, Thornhill (CA)

(73) Assignee: Rogers Communications Inc., Toronto, Ontario (CA)

( * ) Notice: Subject to any disclaimer, the term of this patent is extended or adjusted under 35 U.S.C. 154(b) by 57 days.

(21) Appl. No.: 13/938,403

(22) Filed: Jul. 10, 2013

(65) Prior Publication Data

US 2015/0017945 A1    Jan. 15, 2015

(51) Int. Cl.
*H04M 11/00* (2006.01)
*H04W 60/00* (2009.01)
*H04M 15/00* (2006.01)
*H04W 12/08* (2009.01)

(52) U.S. Cl.
CPC .......... *H04W 60/00* (2013.01); *H04M 15/854* (2013.01); *H04W 12/08* (2013.01)
USPC ........................................... 455/408

(58) Field of Classification Search
USPC ........................................... 455/408
See application file for complete search history.

(56) References Cited

U.S. PATENT DOCUMENTS

| | | | |
|---|---|---|---|
| 6,781,972 B1 * | 8/2004 | Anderlind et al. | 370/329 |
| 8,346,672 B1 | 1/2013 | Weiner et al. | |
| 2009/0327401 A1 * | 12/2009 | Gage | 709/203 |
| 2011/0078025 A1 | 3/2011 | Shrivastav | |
| 2011/0313870 A1 | 12/2011 | Eicher et al. | |
| 2012/0244885 A1 | 9/2012 | Hefetz | |
| 2012/0303534 A1 | 11/2012 | Keller et al. | |
| 2013/0268357 A1 * | 10/2013 | Heath | 705/14.53 |

FOREIGN PATENT DOCUMENTS

WO    2009082369    7/2009

OTHER PUBLICATIONS

Gemalto: "8 Myths About Mobile NFC" dated Jan. 24, 2013.
Codamation: "Mobile Wallet" dated Jan. 24, 2013.
Google: "Lost or Stolen Device—Wallet Help" dated Jan. 24, 2013.
(Continued)

*Primary Examiner* — Joel Ajayi
(74) *Attorney, Agent, or Firm* — Rowand LLP

(57) ABSTRACT

Methods, devices and servers for exchanging information about the status of mobile communications are described. In one aspect, a method is implemented on a device status exchange server, which includes: storing a plurality of profiles associated with a plurality of mobile communication devices that are serviced by a wireless service provider having a wireless service provider server which tracks information about the mobile communication devices, the plurality of profiles storing at least some of the information tracked by the wireless service provider server; receiving, from third party servers, subscription requests for notification of an update in information associated with one of the mobile communication devices; registering the received subscription requests; detecting an update to the information stored in one of the profiles based on information received from a server; and in response to detecting the update: updating the profile associated with the mobile communication device associated with the updated information; and notifying the third party servers of the update in accordance with registered subscription requests.

14 Claims, 6 Drawing Sheets

(56) References Cited

OTHER PUBLICATIONS

Federal Reserve Bank of Boston: "Mobile Payments Solutions Found Secure; Consumer Security Adoption Concerns" Press Release dated Jan. 10, 2013.

Usaid: "Mobile Financial Services Risk Matrix" dated Jul. 23, 2010.
The New Zealand Herald: "NZ Telcos Mull Blacklisting Stolen Cellphones" dated Apr. 18, 2012.
Isis: "Welcome to Isis" dated Jan. 24, 2013.

* cited by examiner

METHODS AND SYSTEMS FOR ELECTRONIC DEVICE STATUS EXCHANGE

TECHNICAL FIELD

The present disclosure relates generally to mobile communication devices. More specifically, it relates to methods and devices device status exchange server for exchanging information about the status of such mobile communication devices.

BACKGROUND

Electronic devices, such as smartphones or tablets, may be used for a number of purposes for which they were not traditionally used. For example, electronic devices are increasingly being used as a mobile wallet. That is, such electronic devices may be capable of storing virtual payment credentials, and initiating and performing mobile payments. By providing such capabilities, a user may use the electronic device to purchase goods and services instead of paying by cash, cheque or a plastic credit card. In such cases, the electronic device may store financial instrument information (such as credit card information) on an associated SIM card, and this financial instrument information is provided to a merchant's point of sale (POS) terminal during a mobile payment transaction.

A number of institutions, such as financial institutions, mobile network operators (MNO), trusted service manager (TSM) systems, and mobile wallet server systems may internally track information about an electronic device including a mobile communication device. That is, each of these institutions may maintain their own database of information associated with a mobile communication device.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

Figure 1:
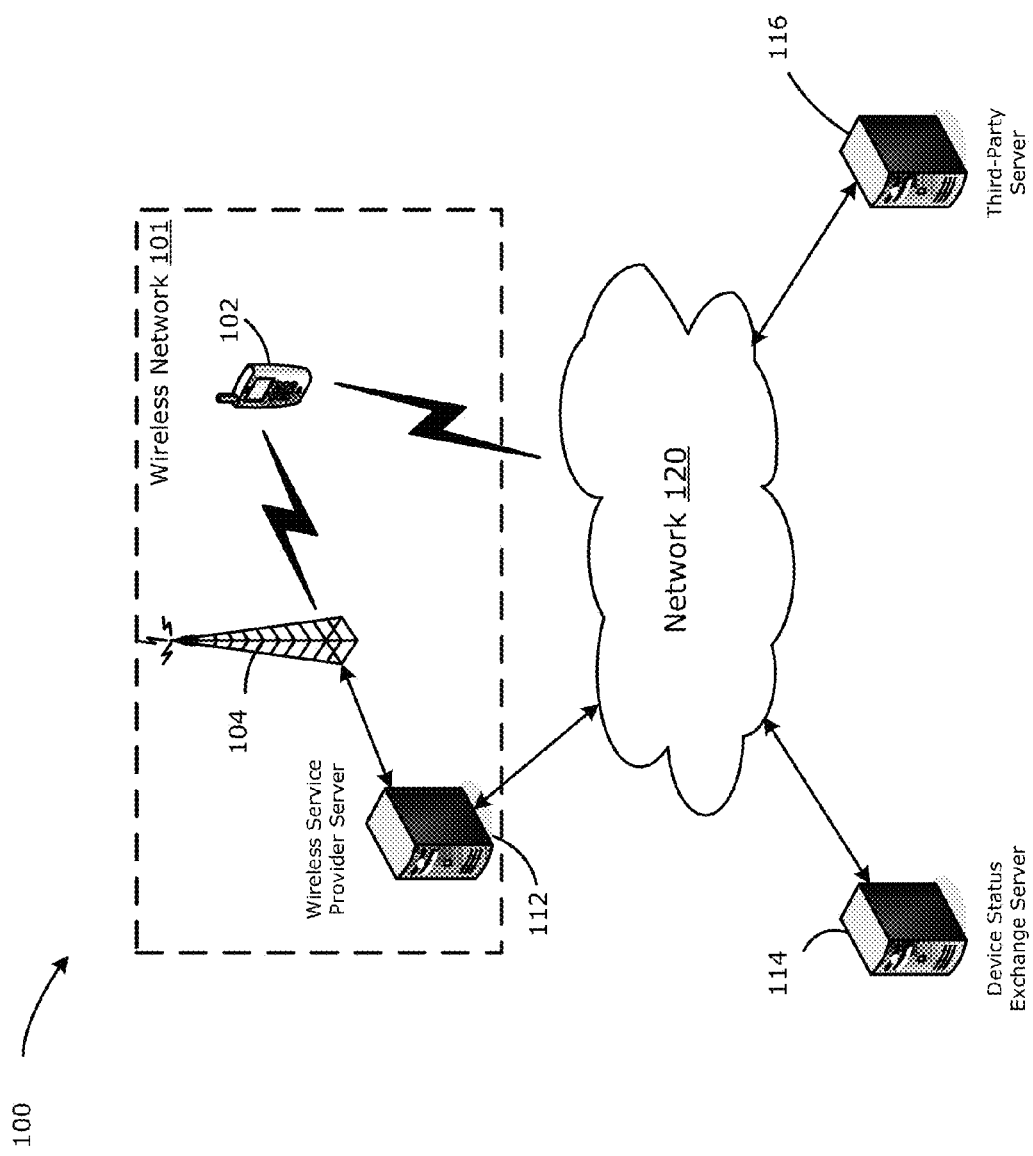
FIG. 1 shows a block diagram illustrating an example communication system in which example embodiments of the present disclosure may operate.

In one aspect, a method implemented on a device status exchange server is described. The method includes: storing a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server; receiving, from one or more third party servers, one or more subscription requests for notification of an update in information associated with one of the mobile communication devices; registering the one or more received subscription requests for the one or more third party servers; detecting an update to the information stored in one of the profiles based on information received from a server; and in response to detecting the update: updating the profile associated with the mobile communication device associated with the updated information; and notifying one or more of the third party servers of the update in accordance with one or more registered subscription requests.

In another aspect, a device status exchanger server is described. The device status exchange server includes a communication subsystem and a memory. The device status exchange server also includes a processor coupled to the communication subsystem and the memory. The processor is configured to: store a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server; receive, from one or more third party servers, one or more subscription requests for notification of an update in information associated with one of the mobile communication devices; register the one or more received subscription requests for the one or more third party servers; detect an update to the information stored in one of the profiles based on information received from a server; and in response to detecting the update: update the profile associated with the mobile communication device associated with the updated information; and notify one or more of the third party servers of the update in accordance with one or more registered subscription requests.

In yet another aspect, a non-transitory computer readable storage medium is described. The non-transitory computer readable storage medium includes instructions which, when executed, configure a device status exchange server to: store a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server; receive, from one or more third party servers, one or more subscription requests for notification of an update in information associated with one of the mobile communication devices; register the one or more received subscription requests for the one or more third party servers; detect an update to the information stored in one of the profiles based on information received from a server; and in response to detecting the update: update the profile associated with the mobile communication device associated with the updated information; and notify one or more of the third party servers of the update in accordance with one or more registered subscription requests.

Other aspects and features of the present application will become apparent to those ordinarily skilled in the art upon review of the following description of specific embodiments of the application in conjunction with the accompanying figures.

Example Communication System

Reference is first made to FIG. 1, which illustrates in block diagram form a communication system 100 in which example embodiments of the present disclosure may operate.

In the embodiment of FIG. 1, an electronic device 102 is illustrated. More specifically, the electronic device 102 is a mobile communication device, such as a smartphone or tablet. The electronic device 102 may be capable of data communications, or both voice and data communications. The mobile communication device may communicate with other electronic devices, servers and/or systems connected with the communication system 100.

Accordingly, in at least some example embodiments, the electronic device 102 is connected for communication via one or more wireless networks which may include Wireless Wide Area Networks (WWAN), Wireless Local Area Networks (WLAN), other network arrangements, and/or a combination of these networks. A WWAN is commonly referred to as a "cellular network", and may include a number of transceiver base stations 104 (with one being shown in FIG. 1). The transceiver base station 104 provides wireless radio frequency coverage for a corresponding area or cell, in order to facilitate wireless communication for the electronic device 102.

The WWAN may be operated by one or more wireless service providers that provide the communication services necessary for the electronic device 102 to connect to the WWAN. The WWAN may conform to various network types (such as, GSM, GPRS, LTE, TDMA, CDMA, etc.), and may support a number of frequency bands for communications within a particular wireless network type (for example, in the GSM network, the transceiver base station may support four frequency bands: 850/900/1800/1900 MHz). The WWAN via a transceiver base station 104 provides a number of channels within a frequency band to allow the electronic device 102 to communicate. That is, the transceiver base station 104 assigns an available channel to the electronic device 102 to establish a communication link within the WWAN.

In the illustrated example of FIG. 1, a WWAN is shown in the form of a wireless network 101. The wireless network 101 is operating by a wireless service provider, and includes at least the transceiver base station 104 which is connected to a wireless service provider server 112. The wireless service provider server 112 is operated by a wireless service provider and may provide specific functions and features for the wireless service provider. A wireless service provider is a provider of communication services to the electronic device 102, and may be referred to as a mobile network operator (MNO). The wireless service provider may own or control all the elements necessary to sell and deliver communication services to the electronic device 102. For example, the wireless service provider may own or control the wireless network infrastructure (which includes the transceiver base station 104 and the wireless service provider server 112), back haul infrastructure, provisioning, billing and customer care computer systems, marketing, engineering and repair organizations, etc. These elements are required in delivering and managing wireless communication services to end-users of electronic devices 102. Examples of wireless service providers include Rogers Wireless™, Telus Mobility™, Verizon Wireless™, AT&T Mobility™, etc.

It will be appreciated that some of the functions of the "wireless service provider server 112" may, in some embodiments, be provided on a server that is not owned or operated by the wireless service provider. For example, in at least some embodiments, a third-party may operate a server that is configured to perform some or all functions of the wireless service provider server 112 discussed herein. For example, in some embodiments, a Mobile Virtual Network Operator (MVNO) may own and/or operate some components of a wireless network such as, for example, a server that is configured to perform some or all of the functions of the wireless service provider server 112 described in this document.

Wireless access may be a subscription-based service. That is, in order for the electronic device 102 to obtain communication services, the electronic device 102 may need to subscribe to a wireless service provider. Such subscription services may be pre-paid (which is commonly referred to as "pay as you go") or may be post-paid subscription services. The wireless service provider provides subscription services in the form of a subscription service package that is purchased by end-users of the electronic devices 102 in order to enable the electronic devices 102 for communication on the wireless network 101. The subscription service package defines the terms of usage of the subscription services such as amount of voice and data communications, number and type of voice and data communications, rates of voice and data communications, etc.

A purchased subscription service package is typically associated with a subscriber identity module (SIM) provided by a wireless service provider. The SIM may, in some embodiments, be a "virtual SIM", which consists of a phone number provided by a MNO that does not require a SIM card to connect to a network. In some embodiments, the SIM may be provided as a physical element referred to as a "SIM card" (which may also be referred to as a universal integrated circuit card (UICC)). The SIM card may be inserted into the electronic device 102. The SIM stores unique identifiers (such as a mobile subscriber integrated services digital network number (MSISDN) which is commonly referred to as a phone number, a unique serial number (ICCID) and an international mobile subscriber identity (IMSI)) and associated security keys that are allocated by the wireless service provider, in order to identify and authenticate subscribers on the wireless network 101.

When an end-user purchases a subscription service package from a wireless service provider, the end-user is subscribed to the wireless service provider. In such instances, the electronic device 102 of the end-user is provisioned for communication on the wireless network 101. More particularly, the wireless service provider services the electronic device 102 to manage communication services for the electronic device 102. The wireless service provider may maintain and/or have access to identifying information associated with a subscribed end-user in order to define a subscriber profile for the end-user. The identifying information may include personal information, electronic device information and/or financial information, all associated with the end-user. Such information may be tracked by the wireless service provider server 112 and memory associated with the wireless service provider server 112 may be configured to store such information. It will be appreciated that in at least some example embodiments, a third-party organization may track and store the identifying information. In such cases, the wireless service provider may have access to the identifying information maintained by the third-party organization.

Personal information may include personal identifying information of the end-user such as a name, date of birth, address, email address, alternate phone, etc. Such personal information is obtained when the end-user purchases a subscription service package from the wireless service provider. In such cases, the wireless service provider directly collects the information from the end-user at the time of purchase of the subscription service package.

The electronic device information may include identifiers, operating states (which may be referred to as operating state information), statuses (which may be referred to as status information) and/or characteristics (which may be referred to as characteristic information) of the electronic device 102. For example, in at least some example embodiments, the identifiers of the electronic device 102 may include identifiers of the associated SIM card that is being operated within the electronic device 102 which includes a MSISDN (i.e. a phone number), an ICCID (which is a serial number uniquely identifying a SIM card) and a IMSI (which is a unique number used to identify the end-user on a network); and identifiers of the electronic device 102 itself including an IMEI (which is a unique number allocated to an electronic device 102 in order to identify it).

The operating state information may include information on whether the electronic device 102 is locked (i.e. access to a security domain within the associated SIM of the electronic device 102 is blocked. A security domain may include one or more applications that trust a common security token for authentication. In such cases, access to these one or more applications by the electronic device 102 may be restricted) or unlocked (i.e. access to a security domain within the associated SIM of the electronic device 102 is allowed. In such cases, as a security domain may include one or more applications with a common trusted security token, these one or more applications may be accessible by the electronic device 102), currently switched on or off, cancelled (i.e. the electronic device 102 is no longer enabled to perform communication services) or suspended (i.e. the electronic device 102 is temporarily disabled to perform communication services).

The status information may include information on whether the electronic device 102 or the associated SIM card is blacklisted as being lost or stolen, a roaming status of the electronic device 102, etc. The characteristic information may, for example, indicate physical (such as, the colour, design, model, etc. of the electronic device 102) and/or operational features (e.g. whether hardware or software components of the electronic device 102 have been upgraded, the associated operating system version, firmware version, etc.) of the electronic device 102. It will be appreciated that the electronic device information accessible by the wireless service provider may include other types of information not specifically listed herein.

The financial information may include credit history information associated with the end user. The wireless service provider may build a credit rating for each of its subscribed users based on payment history of the user in paying for the subscribed services. Generally, users that pay for the subscribed services on time and/or are subscribers for a longer period time have higher credit ratings than users that fail to make payments on time and/or are subscribers for a shorter period. Such credit worthiness information of an end-user is maintained by the wireless service provider.

The identifying information of an end-user may continuously change and be updated by the wireless service provider. Personal information, electronic device information and/or financial information may all change. Such identifying information may be tracked by the wireless service provider and updated when the identifying information changes. More particularly, the wireless service provider server 112 may track the identifying information for changes, and record changes in the identifying information to update the associated subscriber profile of the end-user.

The identifying information may be tracked by the wireless service provider server 112 by various means. For example, for personal information, the wireless service provider server 112 may track the information by being notified of changes in the information when the end-user changes this information. In such cases, when the end-user changes the personal information (such as, his/her address), the end-user informs the wireless service provider of the change, which is then recorded by the wireless service provider server 112 (i.e. it is stored in memory). In other instances, the tracking may be performed in a more direct manner. For example, for electronic device information, the wireless service provider server 112 may obtain changes in the information (such as, an operating state) directly from the electronic device 102 as the information is changed, and record such a change. Such information may be communicated by the electronic device 102 via wireless communication.

In at least some example embodiments, the wireless service provider server 112 may store the identifying information, which may be continuously updated. However, in other instances, the wireless service provider server 112 may not store some or all of the identifying information. Instead the identifying information may be stored in another device, server or system. In at least some example embodiments, some or all of this identifying information may be stored in a device status exchange server 114. In such an example, the wireless service provider server 112 may have access to the information enabling the wireless service provider server 112 to update the information stored within the device status exchange server 114. It will be appreciated that this information stored in the device status exchange server 114 may be received from other devices, systems and/or servers (including the wireless service provider server 112 and/or third party servers 116), and may be similarly accessible by these other devices, systems and/or servers for updating. Additionally, this device status exchange server 114 may or may not be affiliated with the wireless service provider (i.e. it may or may not be owned and operated by the wireless service provider).

As illustrated, the devices and servers (i.e. the device status exchange server 114 and the wireless service provider server 112) may connect and communicate with one another via a network 120. The network 120 may be a public network or a private network, or a combination thereof, and may include the internet. For example, the wireless service provider server 112 and the third party server 116 may interact with the device status exchange server 114 to send information for storage and subsequently update this information. It will be appreciated that the device status exchange server 114 may be a cloud based server; in which case, the wireless service provider server 112 and the third party server 114 may communication with the cloud based device status exchange server 114 via the network 120 (which typically includes the internet).

As mentioned above, the device status exchange server 114 may receive and store identifying information that is received from various sources. The received information may be arranged and stored in various manners within the device status exchange server 114. For example, in some example embodiments, the received information is arranged to define a profile for each electronic device. That is, the device status exchange server 114 creates profiles storing information associated with the electronic devices. More particularly, a profile for an electronic device may include associated personal information (i.e. personal information of all of the users that used the electronic device), electronic device information (which may include identifiers, operating states, statuses and/or characteristics of the electronic device), and financial information (for example, credit history information of all the users that used the electronic device). As such, the device status exchange server 114 maintains various types of information for a plurality of electronic devices.

The information included in the profiles may be accessible by the wireless service provider server 112 and/or the third party servers 116 (the third party servers 116 are servers that are owned and operated by other organizations, such as, financial institutions, retailers, TSM vendors, mobile wallet vendors, etc.). For example, in at least some example embodiments, these other servers may access the information directly. In at least some example embodiments, the device status exchange server 114 may control access to the information. In at least some such example embodiments, these other servers may access the information by requesting access from the device status exchange server 114. For example, in at least some example embodiments, the device status exchange server 114 may be equipped with an application programming interface (API) which allows applications included in these other servers to request access to this information. In response to receiving such requests via the API, the device status exchange server 114 may provide access to the information to the requesting application.

In at least some example embodiments, the device status exchange server 114 may control the level of accessibility of the information for each server (i.e. for each wireless service provider server and/or third party server). For example, in at least some example embodiments, full accessibility rights may include the ability to read, write, delete and/or modify the information by a server. While in at least some example embodiments, a server may be restricted from performing some or all of these operations when accessing the information. Further, in at least some example embodiments, the device status exchange server 114 may prevent complete access of the information by a server. In such cases, the blocked server may not even be aware of the information stored in the device status exchange server 114. Additionally, the accessibility rights may allow restrictions or permissions to be set on a per-device basis and/or for specific types of information. For example, a third party server 116 may have full access to some of the information associated with an electronic device, but may have restricted or no access to some of the other information associated with the electronic device. Similarly, a third party server 116 may have full access to information associated with one electronic device, but may have restricted or no access to information associated with another electronic device.

In at least some example embodiments, the accessibility rights may be established by these other servers (i.e. the wireless service provider server 112 and/or the third party servers 116). That is, these other servers may instruct the device status exchange server 114 to control the level of accessibility of the information to each other. For example, a third-party server may allow full, restricted or no access to another third-party server for some or all of the information associated with an electronic device. Typically, it is the information that a server initially sends to the device status exchange server 114 for storage that it can control access to. That is, one of the servers (i.e. the server which first provided the information) may be considered to be the owner of certain information and that server is permitted to control (e.g. by instructing the device status exchange server 114) the accessibility rights for other servers. For example, it may grant read permissions for the information to specified servers and may grant write permissions for the information to specified servers (i.e. to allow the other servers to update the information).

Accordingly, the information in the device status exchange server 114 may be varied, and more particularly, updated. As mentioned above, electronic device information may constantly change due changes associated with the electronic device 102 (and similarly, personal information may change due to changes in the status of the subscriber); and as such, the server that obtains the changed information may access the information in the device status exchange server 114 to update it. In some cases, servers that initially sent the information for storage may update this information when they determine that the information has changed. For example, the wireless service provider server 112 may send information that is tracked by the wireless service provider server 112 (i.e. information about electronic devices 102) to the device status exchange server 114. That is, changes in this tracked information may cause the wireless service provider server 112 to update "old" information stored in the device status exchange server 114. Similarly, the third-party server 116 may send some of the information for storage at the device status exchange server 114, and changes in this information may cause the third-party server to update this stored information (i.e. it may cause the third-party server to send the new information to the device status exchange server 114 for storage). Additionally, in at least some example embodiments, the wireless service provider server 112 and/or the third party server 116 may grant other servers permission to update the information previously sent by the wireless service provider server 112 and/or the third party server 116 for storage, when these other servers determine changes in the information.

As such, the device status exchange server 114 functions as a central data store for electronic device related information that is continuously updated, and is accessible by other servers. Additionally, the device status exchange server 114 may further function to inform other servers of changes in the information as the information is updated. That is, the device status exchange server 114 may grant subscription requests to these other servers in order to obtain notification about changes in the information when the information is updated. More specifically, the device status exchange server 114 may receive and register subscription requests for notification of an update in the information from third party servers 116. A subscription request may identify a request for notification to updates in particular types of information (such as, an operating state of an electronic device) and/or a request for notification to updates in information for particular electronic devices. The device status exchange server 114 may then detect an update based on, for example, information received from the wireless service provider server 112 or a third party server 116. In response to receiving the update, the device status exchange server 114 updates the information (the profile associated with the electronic device 104 to which the information relates is accordingly updated), and notifies the third party servers 116 of the update in accordance with the registered subscription requests. That is, third party servers 116 that requested to be informed when the particular information is changed are notified of this change in information. In at least some example embodiments, the notification sent by the device status exchange server 114 and received by the third party servers may include the information prior to being updated (i.e. the "old" information) as well as of the update in the information (i.e. the "new" information). As such, the device status exchange server 114 implements a push-based notification system for updates. A push notification is a type of communication initiated by the device status exchange server 114, as opposed to in reply to a request from the other servers. The communication may include information about the update to which these other servers have subscribed to. Accordingly, these notifications may be sent to these subscribing servers whenever an update of the information has occurred.

A third party server 116 that updates the information (i.e. the third party server 116 which sent the updated information to the device status exchange server 114) does not need to be informed of the update (as the third party server 116 is already aware of the update). Thus, in some embodiments, the notification is not sent to the third party server 116 that updated the information.

As mentioned above, in some instances, a third party server that originally sent the information for storage by the device status exchange server 114 may grant authorization, via the device status exchange server 114, to other third party servers to update this stored information. In such cases, when one or more of these other third party servers update this stored information, the third party server that previously sent the stored information is notified of the update by the device status exchange server 114 (in this case, the third party server may not be aware of the update).

The device status exchange server functions as a central repository that stores information about electronic devices. By allowing for easy accessibility of the information, the information may be readily shared among various organizations, and maintained up-to-date. Additionally, organizations may keep track of any changes in the information relevant to the organization by being notified of these changes as they occur. Organizations may now be able to leverage the knowledge of other organizations in order to obtain relevant information about electronic devices that is otherwise not readily available. By way of example, certain organizations might benefit from knowledge about the colour of the electronic device 102. For example, if the electronic device 102 is equipped with mobile wallet functionality, knowledge of the colour of the electronic device 102 might be useful when determining whether a transaction should be processed. More particularly, if the colour of the device being used for a transaction does not match its expected colour, then this may be one indicator of potential fraud. In some embodiments, various third party servers who may benefit from knowledge of the colour of the electronic device may share information about the colour with other such servers using the device status exchange server 114. Similarly, in a further example, within the context of a mobile payment transaction, knowledge of the model of the electronic device 102 may be used to determine whether to process the transaction. In such cases, if the model of the device being used for the transaction does not match its expected model, then this may be a further indicator of potential fraud. Such model-related information may similarly be shared among various servers via the device status exchange server 114. It will be appreciated that the information shared and used may be any type of information discussed above.

As noted above, some of the information that may be shared using the device status exchange server 114 may be text-based information such as, for example, colour information, numbers associated with the electronic device such as the IMEI, etc. However, in some embodiments, other types of data may be exchanged using the device status exchange server 114 instead of or in addition to text data. By way of example, in some embodiments, images may be exchanged. For example, when a user brings their electronic device near a payment terminal to complete a transaction using near field communication (NFC) technology, a photograph may be captured of the electronic device and sent to the device status exchange server 114 from a third party server associated with the payment terminal. This would permit other third party servers associated with other payment terminals to view or analyze the photograph when processing subsequent transactions to assess whether the electronic device 102 is the same electronic device that was previously used to complete a transaction.

Example components and features of the device status exchange server 114, the wireless service provider server 112 and the third party server 116 will be discussed in greater detail below with reference to FIGS. 2, 4 and 5 respectively.

While a single third party server 116 is illustrated in FIG. 1, it will be understood that the device status exchange server 114 may connect to a plurality of third party servers 116 in some embodiments.

It will also be appreciated that the above-described communication system 100 is provided for the purpose of illustration only, and that the above-described communication system 100 includes one possible communication network configuration of a multitude of possible configurations.

For example, while the wireless service provider server 112, the device status exchange server 114 and the third party server 116 are illustrated as a single component, in practice it may be constructed of a number of components which may be physically separated from one another.

Example Device Status Exchange Server

Figure 2:
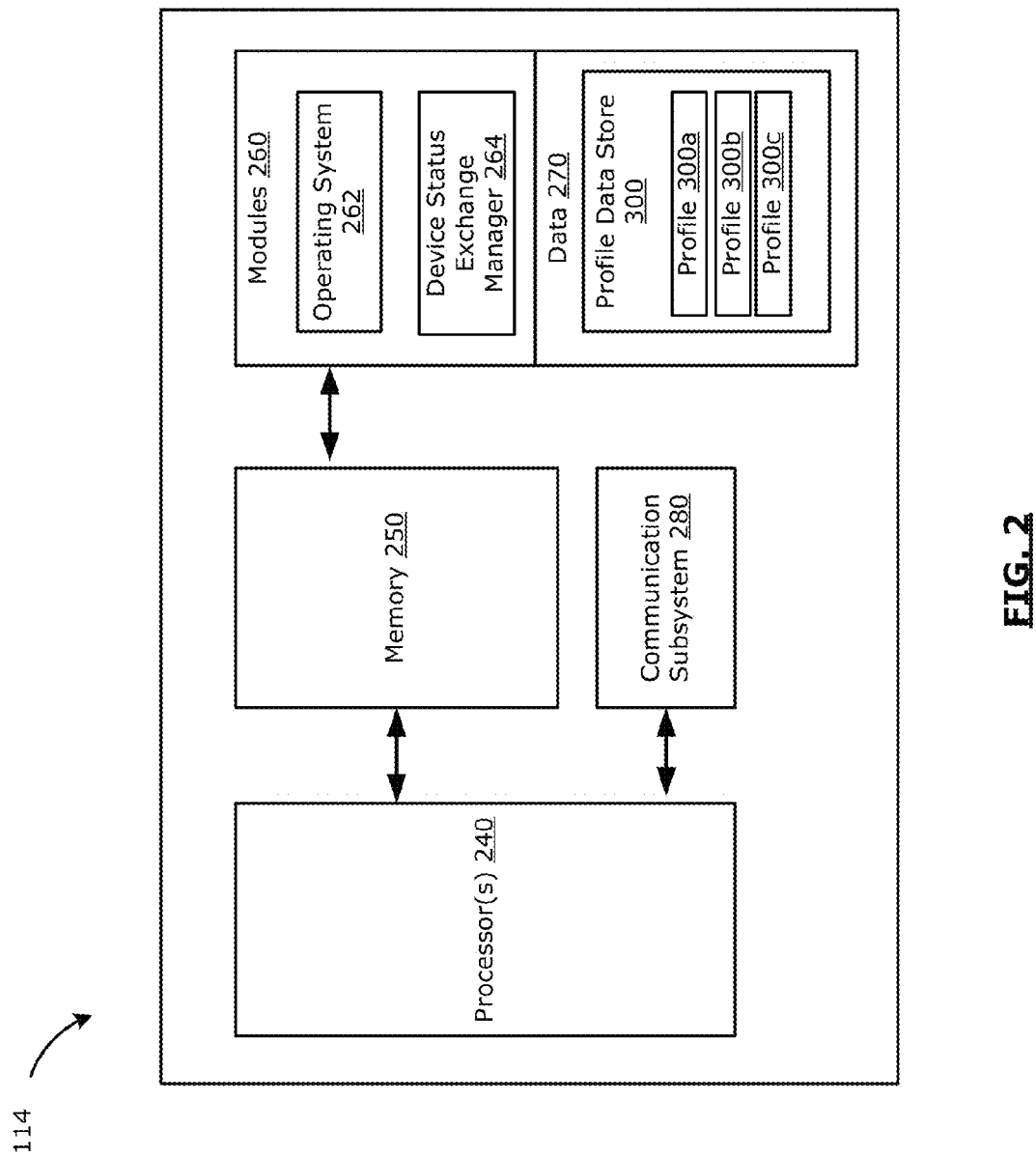
FIG. 2 shows a block diagram of an example device status exchange server in accordance with example embodiments of the present disclosure.

Reference is next made to FIG. 2 which illustrates an example device status exchange server 114 in block diagram form. Although the device status exchange server 114 is shown to be implemented as a single server, it will be understood that the functions of the device status exchange server 114 may be implemented across a multitude of network servers, or other suitable architecture.

In at least some embodiments, the functions of the device status exchange server 114 may be implemented, in whole or in part, by way of a processor 240 which is configured to execute software modules 260 stored in memory 250. In the embodiment of FIG. 2, the device status exchange server 114 includes a controller comprising one or more processors 240 which control the overall operation of the device status exchange server 114. The processor 240 interacts with one or more communication subsystems 280 to perform communication functions via the network 120, with other systems, servers and/or devices such as the electronic device 102, the wireless service provider server 112 and the third-party server 116. The communication subsystem 280 may, for example, include a subsystem that is configured to connect the device status exchange server 114 with the wireless service provider server 112 and/or the third-party server 116, over the network 120.

The device status exchange server 114 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The device status exchange server 114 may store data 270 in a data area of the memory 250. The data 270 may be of various types and may include service data, application data, profile data, subscription request data, etc. The data 270 may be organized, at least partially, into one or more databases or data stores, each containing data items of the same data type. For example, profiles 300a, 300b, 300c of electronic devices, and subscription requests for notification of an update in the profiles may be stored in a database. By way of example, profiles 300a, 300b, 300c may be stored in a profile data store 300 which is a database configured for storing profiles, while the subscription requests may be stored in a subscription request data store (not shown). Each profile 300a, 300b, 300c may be associated with a separate electronic device 102 and/or a separate user or subscriber.

The processor 240 may operate under stored program control and may execute software modules 260 stored in the memory 250. The software modules 260 may be comprised of, for example, operating system 262 software, and one or more additional modules such as a device status exchange manager 264 to carry out specific functions of the device status exchange server 114.

The device status exchange manager 264 receives information associated with the electronic devices from the wireless service provider server 112 and/or the third party servers 116 (the information is sent by these servers for storage by the device status exchange manager 264). The device status exchange manager 264 creates profiles 300a, 300b, 300c for the electronic devices based on this received information, and subsequently stores these profiles in the memory 250. For example, the device status exchange manager 264 may permit profiles 300a, 300b, 300c to be stored in a profile data store 300 in the data 270 area of the memory 250.

As mentioned above, profiles store information associated with electronic devices. More specifically, each profile contains information associated with a particular electronic device. The information may include personal information (i.e. personal information of users that used the electronic device), electronic device information (which may include identifiers, operating states, statuses and/or characteristics of the electronic device), and financial information (for example, credit history information of all the users that used the electronic device). An example profile will be discussed in greater detail below with reference to FIG. 3.

The device status exchange manager 264 further manages these profiles. More particularly, information included within these profiles is managed by the device status exchange manager 264. This information is considered "dynamic" information and may continuously change as properties of the associated electronic devices are changed. As such, the device status exchange manager 264 may provide provisions for the information to be updated. Updating may include the features of reading, inserting, deleting and/or modifying the information in the profiles. The updates are generally provided by servers, such as the wireless service provider server 112 and/or the third party servers 116 as the updates become available to these servers.

In some instances, the device status exchange manager 264 may control the updating of the information. In such example embodiments, these other servers may request to update the information by requesting access from the device status exchange manager 264. For example, in at least some example embodiments, the device status exchange manager 264 may include an API which allows applications included in these other servers to request access to update this information. In response to receiving such requests via the API, the device status exchange manager 264 may provide access to the information for updating to the requesting applications of the other server. However, in other instances, the other servers may access and update the information directly, and may not need to request permission from the device status exchange manager 264.

Additionally, in at least some example embodiments, the device status exchange manager 264 may prevent some or all types of updating of the information by the other servers. That is, the device status exchange manager 264 may control the level of updating that may be performed by a particular server. In such cases, a server may manipulate the device status exchange manager 264 to control the updating of information by other servers (it will be appreciated that the server may only control the accessibility of information that it has initially provided to the device status exchange manager 264). For example, a wireless service provider server 112 may grant permission, via the device status exchange manager 264, to only a particular third party server to update the information (that it has previously provided), and not to other third party servers. Similarly, the level of updating granted to this third party server may also be restricted (for example, the third party server may only be allowed to read and insert information but may not modify the information).

The device status exchange manager 264 may further have the capability to notify servers of updates in the information. In such cases, the device status exchange manager 264 may function as a subscription manager allowing servers to subscribe to the device status exchange manager 264 to request for notification in updates to the information. For example, in at least some example embodiments, the device status exchange manager 264 may receive subscription requests from third party servers 116 requesting for notification of an update in the information, and register these subscriptions requests (i.e. record and store these received subscription requests in memory 250). These subscription requests may be particularized for a third party server 116. For example, the subscription request may identify one or more types of information relevant to the third party server 116. That is, the subscription request may only request to be notified of updates to particular types of information (such as, of a change in the operating state) for an electronic device. Moreover, the subscription request may, additionally or individually, identify one or more electronic devices relevant to the third party server 116. That is, the subscription request may only request to be notified of updates to profiles of selected electronic devices.

The device status exchange manager 264 may then detect an update based on information received from the wireless service provider server 112 or the third party server 116. For example, as mentioned above, the wireless service provider server 112 may track information about subscribed electronic devices, and send some or all of this tracked information to the device status exchange manager 264. This received information is arranged and stored in profiles 300a, 300b, 300c. As this information is "dynamic", the wireless service provider server 112 may determine changes in the previously sent and tracked information, and send this updated information to the device status exchange manager 264. The third party server 116 may also send information about the electronic devices to the device status exchange manager 264 which is similarly arranged and stored in the profiles 300a, 300b, 300c. Again, the third party server 116 may determine changes in the information, and send this updated information to the device status exchange manager 264. The device status exchange manager 264 may detect the update upon receiving this updated information from the wireless service provider server 112 and/or the third party server 116.

In response to receiving the update, the device status exchange manager 264 updates the information in the profile to which it pertains, and notifies the appropriate third party servers 116 of this update based on the registered subscription requests. That is, third party servers 116 that requested to be informed of the particular update in the information (which is indicated within their subscription requests), are notified of the update. For example, a third party server 116 may be notified of an update to an operating state of a particular electronic device if the subscription request for the third party server 116 indicates notifications of any updates to the operating state of the electronic device. In order to further illustrate the update to the third party server, in at least some example embodiments, the notification may include both the information prior to being updated (i.e. the "old" information) as well as of the update in the information (i.e. the "new" information). As such, the server may view the change of status in the information.

As mentioned above, a third party server may authorize the device status exchange manager 264 to permit other third party servers to update the information that it has previously sent to the device status exchange manager 264. For example, the device status exchange manager 264 may receive authorization, from a third party server that previously sent the stored information, permitting other third party servers to update the stored information. In response to receiving the authorization, the device status exchange manager 264 may grant these other third party servers' permission to update the stored information. In such example embodiments, the device status exchange manager 264 may further notify these other third party servers that the third party server has granted them permission to modify the stored information.

As further mentioned above, a third party server 116 that updates the information does not need to be informed of the update. However, in cases where a different third party server, than the third party server that previously sent information that is stored in a profile 300a, 300b, 300c, updates this stored information, the third party server that previously sent the information is notified of the update by the device status exchange manager 264. It will be appreciated that subscription requests of a third party server may indicate non-notification of updates when the third party server updates information that it has previously sent, and notification of updates when other third party servers update this information. However, in at least some example embodiments, a third party server that sends an update to information that it has previously sent may not be notified of the update regardless of its subscription request. In such cases, if the device status exchange manager 264 determines that the third party server that previously sent the information sends the update, the device status exchange manager 264 does not notify this third party server of the update.

In at least some example embodiments, other modules, such as the operating system 262 may perform some or all of the functions of the device status exchange manager 264. In at least some example embodiments, the device status exchange manager 264 may instead include a plurality of software modules rather than a single block as illustrated.

It will be appreciated that the device status exchange server 114 as illustrated in FIG. 2 is an example server. In at least some example embodiments, servers may be used which are of different configurations and/or functions.

Example Profile

The device status exchange server 114 creates and stores a number of profiles that are each associated with an electronic device. A profile stores information associated with an electronic device.

Figure 3:
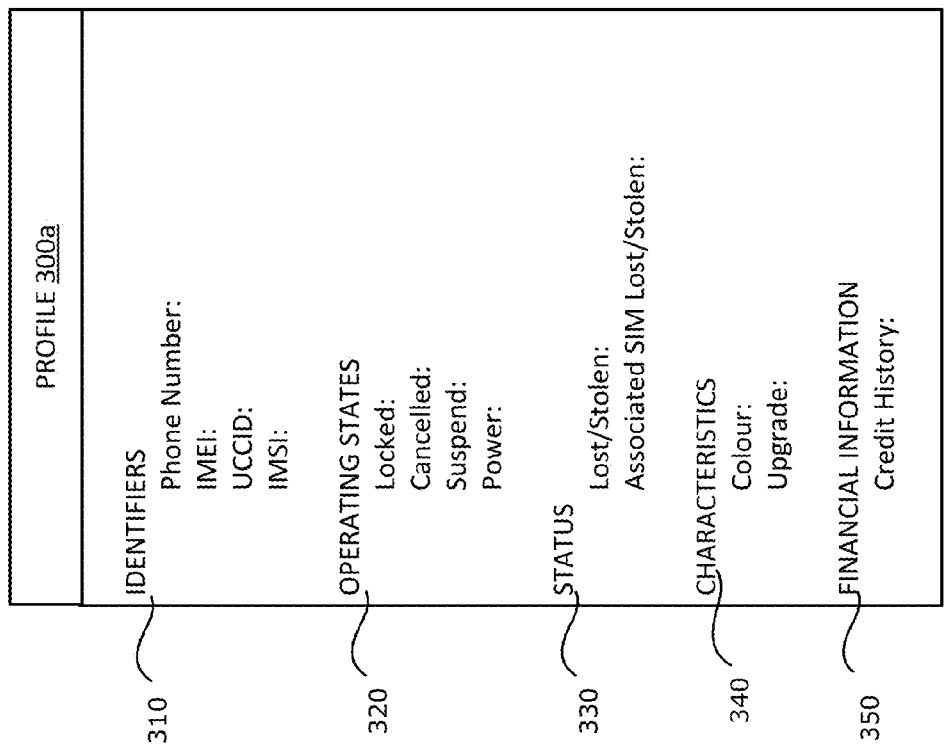
FIG. 3 shows a block diagram of an example profile associated with a mobile communication device in accordance with example embodiments of the present disclosure.

Reference will now be made to FIG. 3, which shows an example profile 300a. The profile 300a includes information related to an electronic device 102, that is received from other servers and devices, such as, the wireless service provider server 112 and/or the third party server 116. For example, information that is tracked and sent by the wireless service provider may be included within the profile 300a. Similarly, information that is collected and sent by a third party server 116 may be included within the profile 300a.

As shown, the information may include, for example, identifiers 310 (which may include identifiers of the electronic device 102 as well identifiers associated with a SIM card that is inserted in the electronic device 102), operating states 320 (which may include activation states as well as communication states of the electronic device 102), status 330 (which may include information as to whether the electronic device 102 is blacklisted as well as whether the associated SIM card inserted in the electronic device 102 is blacklisted), characteristics 340 (which may include physical and operational characteristics of the electronic device 102) and/or financial information 350 (which may include credit history information of the end-user), all associated with an electronic device 102.

Each of these properties may further include a plurality of fields. For example, the identifiers 310 may include a phone number (the phone number of the associated SIM card), an IMEI (the unique equipment identifier of the electronic device 102), an ICCID (the unique serial number of the SIM card) and/or an IMSI (which is a unique number identifying the end-user on the network) fields. The operating states 320 may include a locked state (whether access to security domain within an associated SIM card of the electronic device 102 is prevented), a cancelled state (whether the electronic device 102 is no longer enabled to perform communication services, for example, due to the end-user terminating wireless communication subscription services), a suspended state (whether the electronic device 102 is temporarily disabled to perform communication services, for example, due to the wireless service provider suspending service for non-payment of these services) and/or a power state (whether the electronic device 102 is currently switched on or off) fields. The status 330 may include a lost/stolen status (information as to whether the electronic device 102 is reported stolen or lost and listed on an EIR) and/or an associated SIM lost/stolen status (information as to whether the associated SIM card is reported stolen or lost) fields. The characteristics 340 may include a colour (indicating a colour of a housing of the electronic device 102) and/or an upgrade (indicating whether the hardware and/or software components of the electronic device 102 have been upgraded) fields. The financial information 350 may include a credit history (the credit report information of the end-user) field.

It will be appreciated that the profile may include other information not specifically listed herein and may not include all of the information described above.

In the example profile 300a, the information included in the fields of the identifiers 310, operating states 320, status 330 and/or financial information 350 may be received from the wireless service provider server 112. Such information is the type of information that may be tracked by the wireless service provider (and/or other organizations). Similarly, the information in the fields of the characteristics 340 may be received from the third party server 116. Such characteristics 340 information may be obtained and tracked by organizations other than the wireless service provider (for example, independent retailers of electronic device hardware and software components).

In such example embodiments, fields that are originally populated based on information received from a server are allocated to that server. That is, the server has management over the information in the allocated field. In such cases, the server may control accessibility rights to the information. For example, the wireless service provider server 112 may control the accessibility of information in the fields of the identifiers 310, operating states 320, status 330, and financial information 350; and the third party server 116 may control the accessibility of information in the fields of the characteristics 340. By controlling accessibility, these servers may determine which other servers may read, insert, delete and/or modify information within the respective fields. For example, the wireless service provider server 112 may grant limited rights to the third party server 116 to only read the information in the fields under the control of the wireless service provider server 112. Similarly, the third party server 116 may grant limited rights to the wireless service provider server 112 to only read the information in the characteristics 340 fields; while giving broader rights to other servers to allow them to modify the information in the characteristics 340 fields. It will be appreciated that such accessibility rights to information in the fields may be varied by a controlling server. These management rights may be imposed by the device status exchange manager 264.

Moreover, the information within these fields may be varied (i.e. updated) by the server originally providing the information and/or by other servers. For example, the wireless service provider server 112 may update the locked state field when the wireless service provider server 112 determines that the electronic device 102 device changes its state from a previously unlocked stated to a locked state (the wireless service provider server 112 may track such an operating state of the electronic device 102). Similarly, the third party server 116 may update the colour field when the third party server 116 determines that an end-user changes the colour of the housing of the electronic device 102 (the third party server 116 may be a retailer of electronic device hardware and software components, and may sell and install the new housing on the electronic device 102 and/or may be a retailer or other party processing a financial transaction associated with a mobile payment from the device).

In such example embodiments, the changes in these respective fields are reported to other servers based on their subscription preferences. For example, certain servers may be notified of the change in the locked state field (but not the wireless service provider server 112), and of the change in the colour field (which may include the wireless service provider server 112, but not the third-party server that sent the update), in accordance with their subscription preferences.

It will be appreciated that such examples of management and update of information in the fields are for the purposes of illustration only, and the information within some or all of these fields may be managed and/or updated by other servers.

Example Wireless Service Provider Server

Figure 4:
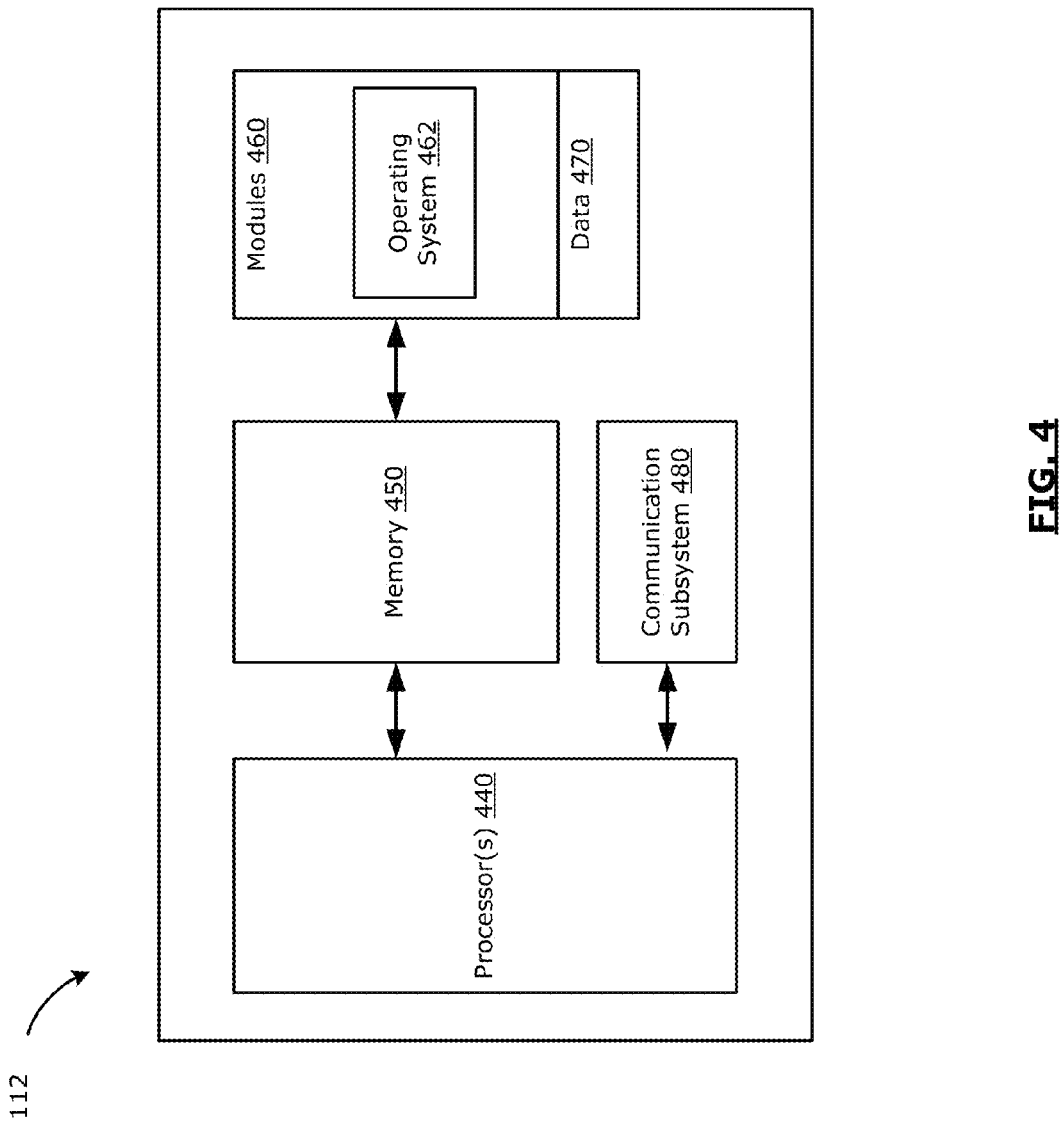
FIG. 4 shows a block diagram of an example wireless service provider server in accordance with example embodiments of the present disclosure.

Reference is next made to FIG. 4 which illustrates an example wireless service provider server 112 in block diagram form. Although the wireless service provider server 112 is shown to be implemented as a single server, it will be understood that the functions of the wireless service provider server 112 may be implemented across a multitude of network servers, or other suitable architecture. Additionally, although the wireless service provider server 112 and the device status exchange server 114 are configured to perform different functions, in at least some example embodiments, the wireless service provider server 112 may be of a similar configuration to the device status exchange server 114.

In at least some example embodiments, the functions of the wireless service provider server 112 may be implemented, in whole or in part, by way of a processor 440 which is configured to execute software modules 460 stored in memory 450. In the embodiment of FIG. 4, wireless service provider server 112 includes a controller comprising one or more processors 440 which control the overall operation of the wireless service provider server 112. The processor 440 interacts with one or more communication subsystems 480 to perform communication functions via the wireless network 101 and/or network 120, with other systems, servers and/or devices such as the electronic device 102, the device status exchange server 114 and the third-party server 116.

The wireless service provider server 112 also includes memory 450 which is connected to the processor 440 for receiving and sending data to the processor 440. While the memory 450 is illustrated as a single component, it will typically be comprised of multiple memory components of various types. For example, the memory 450 may include Random Access Memory (RAM), Read Only Memory (ROM), a Hard Disk Drive (HDD), Flash Memory, or other types of memory. It will be appreciated that each of the various memory types will be best suited for different purposes and applications.

The wireless service provider server 112 may store data 470 in a data area of the memory 450. The data 470 may be of various types and may include service data, application data, subscriber profile data, etc. The data 470 may be organized, at least partially, into a number of databases or data stores each containing data items of the same data type. For example, subscriber profile data may be stored in the same database and arranged accordingly within the database.

The subscriber profile data may be obtained and stored within the data 470 area when an end-user is subscribed to the wireless service provider that operates the wireless service provider server 112. The subscriber profile data defines identifying information for a particular end-user (i.e. a subscriber). This identifying information may be obtained from the end-user and/or automatically obtained by the wireless service provider server 112. As mentioned above, the identifying information may include personal information, electronic device information and/or financial information associated with the subscriber.

At least some of this identifying information is tracked by the wireless service provider server 112. That is, the wireless service provider server 112 is able to obtain updates to this information (either directly or indirectly) as the information is changed. For example, in the case of personal information, the wireless service provider server 112 may determine an update when the subscriber informs the wireless service provider server 112 of a change in the personal information (such as, a change in the subscriber's address). In another example, in the case of electronic device information, the wireless service provider server 112 may determine an update by querying and/or automatically receiving related information from the electronic device 102 when the associated electronic device information changes (such as, a subscriber switching his/her SIM card from one electronic device to another electronic device, in which case, the other electronic device may automatically send its IMEI to the wireless service provider server 112). In a further example, in the case of financial information, the wireless service provider server 112 may determine an update when the subscriber fails to make a payment for subscribed communication services. In such a case, the financial information and particularly, the credit history status of the subscriber will be affected negatively.

In at least some example embodiments, such updates may be determined and stored on the wireless service provider server 112 (for example, within the data 470 area of memory 450, as part of the subscriber profile data).

The processor 440 may operate under stored program control and may execute software modules 460 stored in the memory 450. The software modules 460 may be comprised of, for example, an operating system 462 software. Besides performing the typical functions of an operating system 462 of providing management capabilities of server components, and providing a platform for the software modules, the operating system 462 may perform additional functions and features.

More specifically, in at least some example embodiments, the operating system 462 may send some or all of the identifying information to the device status exchange server 114 for storage (in addition to or instead of storing the information on the wireless service provider server 112). In such example embodiments, the operating system 462 has access to this information, and may send updates to the device status exchange server 114 as they become available. In such example embodiments, the operating system 462 may perform functions similar to the third party server 116. That is, the operating system 462 may manage the information stored in the device status exchange server 114, and may control accessibility rights to this information by other devices and services.

As already mentioned, the information received by the device status exchange server 114 is used to create profiles 300*a*, 300*b*, 300*c* for electronic devices. The profiles 300*a*, 300*b*, 300*c* may further include information received from other devices and servers (such as, the third party server 116). In such cases, the operating system 462 may subscribe to the device status exchange server 114 to receive updates to some or all of the information received from these other devices and servers. Moreover, the operating system 462 may be granted accessibility rights to some or all of the information received from these other devices and servers (for example, the operating system 462 may read, write, delete and/or modify this information).

It will be appreciated that in at least some example embodiments, other modules may perform some or all of the functions of the operating system 462. In at least some example embodiments, the operating system 462 may instead include a plurality of software modules rather than a single block as illustrated.

Example Third Party Server

Figure 5:
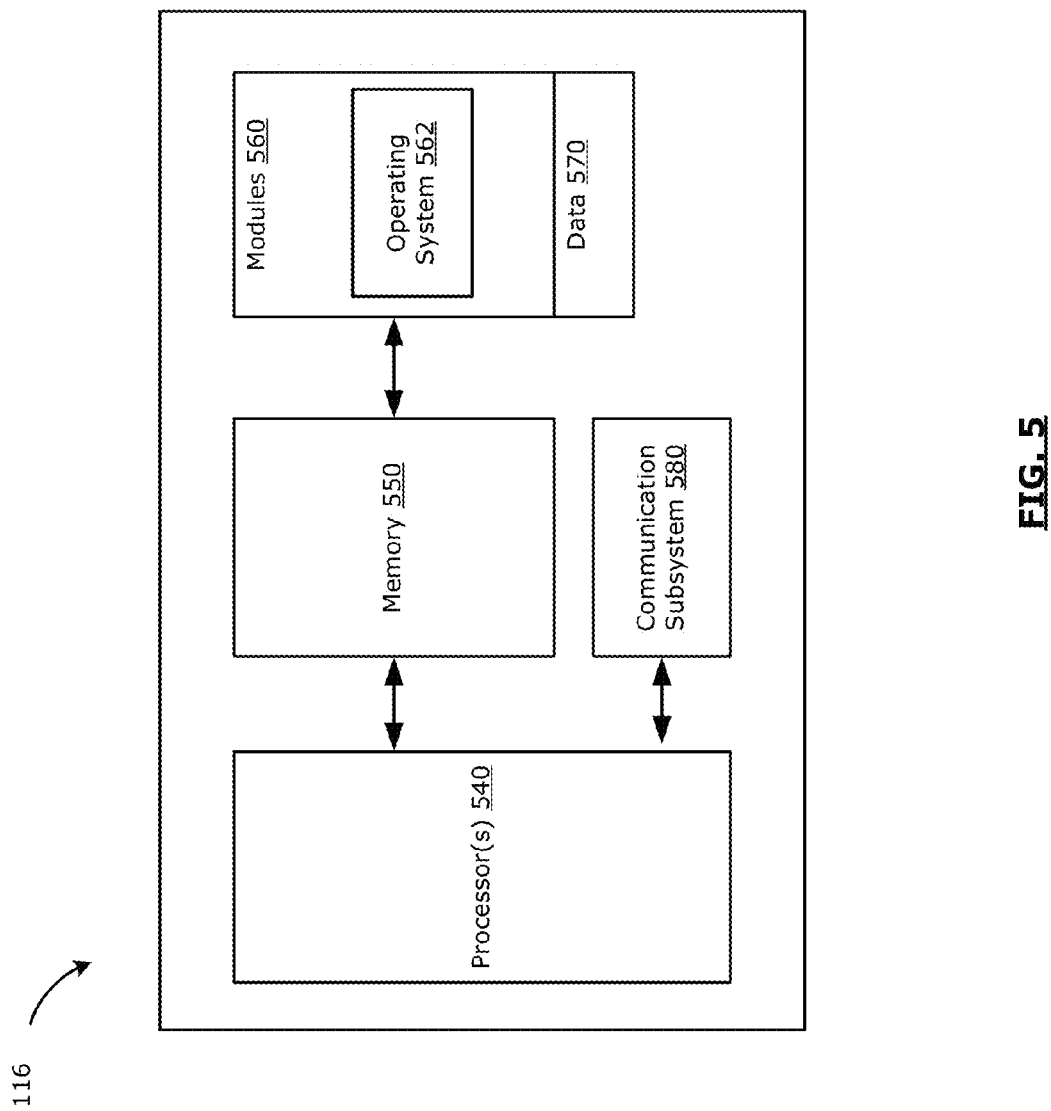
FIG. 5 shows a block diagram of an example third party server in accordance with example embodiments of the present disclosure.

Reference is next made to FIG. 5 which illustrates an example third party server 116 in block diagram form. Although the third party server 116 is shown to be implemented as a single server, it will be understood that the functions of the third party server 116 may be implemented across a multitude of network servers, or other suitable architecture. Additionally, although the third party server 116 is configured to perform different functions than the wireless service provider server 112 and the device status exchange server 114, in at least some example embodiments, the third party server 116 may be of a similar configuration to these servers.

In at least some example embodiments, the functions of the third party server 116 may be implemented, in whole or in part, by way of a processor 540 which is configured to execute software modules 560 stored in memory 550. In the embodiment of FIG. 5, the third party server 116 includes a controller comprising one or more processors 540 which control the overall operation of the third party server 116. The processor 540 interacts with one or more communication subsystems 580 to perform communication functions via the wireless network 101 and/or network 120, with other systems, servers and/or devices such as the electronic device 102, the wireless service provider server 112 and the device status exchange server 114.

The third party server 116 also includes memory 550 which is connected to the processor 540 for receiving and sending data to the processor 540. While the memory 550 is illustrated as a single component, it will typically be comprised of multiple memory components of various types. For example, the memory 550 may include Random Access Memory (RAM), Read Only Memory (ROM), a Hard Disk Drive (HDD), Flash Memory, or other types of memory. It will be appreciated that each of the various memory types will be best suited for different purposes and applications.

The third party server 116 may store data 570 in a data area of the memory 550. The data 570 may be of various types and may include service data, application data, etc. The data 570 may be organized, at least partially, into a number of databases or data stores each containing data items of the same data type.

The processor 540 may operate under stored program control and may execute software modules 560 stored in the memory 550. The software modules 560 may be comprised of, for example, an operating system 562 software. Besides performing the typical functions of an operating system 562 of providing management capabilities of server components, and providing a platform for the software modules, the operating system 562 may perform additional functions and features.

For example, in at least some example embodiments, the operating system 562 may allow for subscribing to the device status exchange server 114 to receive updates in information provided by the wireless service provider server 112. As mentioned above, the third party server 116 may be owned or operated by various types of organization including a financial institution, a retailer, a charity, a political organization, etc. In fact, it could be any type of organization that is interested in obtaining information associated with electronic devices, and which it may then use for various purposes (for example, a financial institution may be interested in obtaining electronic device related information in order to further verify mobile payment transactions). As such, the information desired may vary based upon the type of third party server 116 requesting the information. In such cases, the operating system 562 may set subscription preferences for the request for information from the device status exchange server 114. For example, subscription preferences may be based on the type of information and/or for one or more specific electronic devices. For example, the operating system 562 of a third party server 116 that is a financial institution may set the subscription preference to receive only updates of identifiers and operating states of electronic devices, and of particular electronic devices (i.e. of electronic devices that it provides financial services to). In such example embodiments, such subscription preferences are included within the subscription requests sent from the operating system 562 to the device status exchange server 114. Upon registration of these requests by the device status exchange server 114, the operating system 562 may receive updates whenever the subscribed information and/or information for a subscribed electronic device is updated.

Additionally, the operating system 562 may send information associated with electronic devices to the device status exchange server 114 for storage (which is stored as part of a profile of an electronic device by the device status exchange server 114). Such information may be collected by the third party server 116 in a similar manner as performed by the wireless service provider server 112 (i.e. directly from the electronic device or indirectly, for example, from a user of the electronic device). In such cases, the operating system 562 may manage the information stored in the device status exchange server 114. For example, the operating system 562 may update the information previously sent to the device status exchange server 114. Additionally, the operating system 562 may control accessibility rights to this information by other devices and servers. Moreover, in cases where the operating system 562 may grant rights to another server to change the information, the operating system 562 may be notified of such changes in the information as they occur.

It will be appreciated that in at least some example embodiments, other modules may perform some or all of the functions of the operating system 562. In at least some example embodiments, the operating system 562 may instead include a plurality of software modules rather than a single block as illustrated.

Notifying an Update in Information

Figure 6:
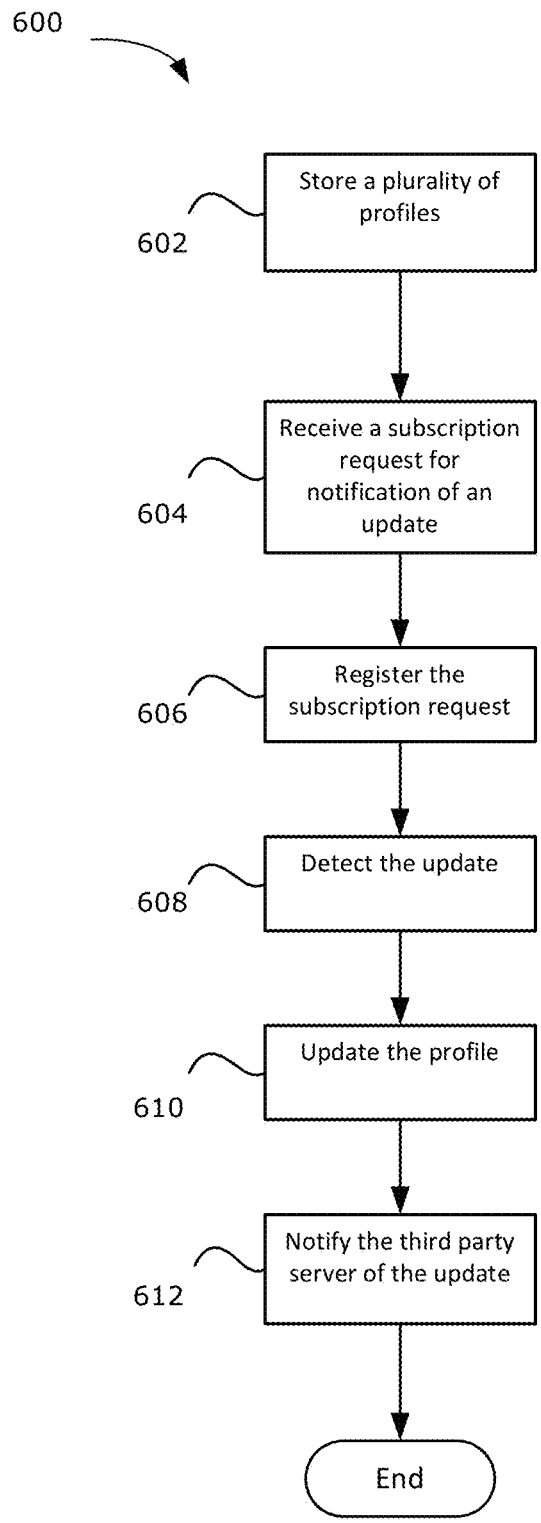
FIG. 6 shows a flowchart of an example method of notifying the third party server of an update in information associated with the mobile communication device.

Referring now to FIG. 6, an example method 600 of notifying the third party server 116 of an update in information associated with an electronic device 102 is illustrated in flowchart form. The method 600 may be implemented by the device status exchange server 114. One or more modules on the device status exchange server 114, such as the device status exchange manager 264, may perform the method 600. More particularly, the device status exchange manager 264 may contain computer readable instructions causing the processor 240 associated with the device status exchange server 114 to perform method 600. It will be appreciated that other modules on the device status exchange server 114 may perform some or all of the device-specific operations of method 600. It will also be appreciated that other servers and associated modules within these other servers may perform the method 600.

The method 600 includes, at 602, the device status exchange server 114 storing a plurality of profiles for a plurality of electronic devices. More specifically, each profile stores information associated with an electronic device. As mentioned above, such information may include personal information (i.e. personal information of all of the users that used the electronic device), electronic device information (which may include identifiers, operating states, statuses and/or characteristics of the electronic device), and financial information (for example, credit history information of all the users that used the electronic device). This information may be received from the wireless service provider server 112 and/or one or more third party server 116. In at least some example embodiments, the information provided by these servers are tracked by them. That is, they may obtain updates to the information as it changes, and may send these updates to the device status exchange server 114 for subsequent updating of the profiles.

The profiles and/or information contained in the profiles, may have certain access rights and restrictions associated therewith. For example, as mentioned above, in at least some example embodiments, a server different than the server that originally sent the information for storage may later update the information. In such example embodiments, a first third party server (or the wireless service provider server) that sent the original information may grant authorization, via the device status exchange server 114, to a second third party server (i.e. a different third party server, which may, in some cases be the wireless service provider server) to update the information (i.e. to update information in the specific field or other logical or physical storage area that stores the type of information originally provided by the first third party server). That is, the first third party server gives permission to the device status exchange server 114 to allow the second third party server to update the information. In at least some example embodiments, the authorization may be directly controlled by the device status exchange server 114. That is, the device status exchange server 114 may decide whether to allow a server different than the server that originally sent the information to update the information, without any further input from the server that originally sent the information. Additionally, the authorization granted by the server that sent the original information and/or the device status exchange server 114 to one or more other servers to update the information may be varied at the request of the server that sent the original information. For example, the authorization may be any one or more of permission to read, write, delete or modify the information by these other servers.

By way of example, if a third party server sends the device status exchange server 114 information which will be inserted into a new field of the profile (such as, for example, information specifying device color), it may grant authorization to other third party servers (and/or the wireless service provider server) to update the information in that field. Thus, other third party servers that are trusted by the third party server that originally sent the information may be permitted to share information related to that field.

In at least some example embodiments, the server that sent the original information may restrict access, via the device status exchange server 114 to some or all of the information by one or more other servers (for example, the restricted server may not even be aware of the original information). In such cases, the server may control the accessibility of the information to these other servers. Such accessibility restrictions may be device-specific and/or information type specific. For example, a first server may restrict access to some or all information relating to one device but not for another device, for a second server. The first server may also restrict access to some information for a device but not other information for the device, for the second server. Similarly, in at least some example embodiments, the device status exchange server 114 may directly control and restrict access to some or all of the original information by these other servers, without any input from the server that originally sent the information. Accordingly, at least some of the stored information received from a third party server may not be accessible to at least one other third party server.

At 604, the device status exchange server 114 receives, from one or more third party servers 116, one or more subscription requests for notification of an update in information associated with one of the electronic devices. As mentioned above, a server may subscribe to the device status exchange server 114 to obtain notifications of updates in the information (provided that the server has authorization to at least read and receive updates to the information). A subscription request may be tailored to meet a third party server's 116 needs. For example, in at least some example embodiments, a subscription request may request for one or more types of information and/or for one or more electronic devices that are relevant to the third party server 116. As such, a third party server 116 may decide what types of information and for which electronic devices to receive notification of updates. At 606, the device status exchange server 114 registers the received subscription requests from the third party servers 116. That is, the device status exchange server 114 may log the request, and determine when the condition of the request is fulfilled (i.e. when an update meets the criteria of a subscription request).

It will be appreciated that a server that sends a subscription request for information must at least have permission to access the information. That is, the server must have been granted authorization or must not have been restricted from at least reading the information. Accordingly, in such example embodiments, the device status exchange server 114, prior to registering a subscription request from a server, may determine whether the server has permission to access the information. For example, the device status exchange server 114 may analyze the accessibility rights of the information by the server, and if the device status exchange server 114 determines that the server has permission or is not restricted from accessing the information, the subscription request is registered. In such cases, the server will receive notification of updates to the information. However, if the device status exchange server 114 determines that the server does not have permission or is restricted from accessing the information, the subscription request is not registered. In such cases, the server may not receive notification of updates to the information even though it requested to be informed of the updates. In at least some example embodiments, the server that sent the original information or the server that updates the information (which may be the server that sent the original information) may instruct the device status exchange server 114 to notify other servers of updates in the information. In such cases, in addition to or instead of receiving subscription requests, the device status exchange server 114 receives instructions to notify other servers of updates. It will also be appreciated that in such cases, these other servers may further have to grant permission to the device status exchange server 114 to receive these updates.

At 608, the device status exchange server 114 may detect an update to the information stored in one of the profiles based on information received from the wireless service provider server 112 and/or a third party server 116. That is, these servers may send updated information of the previously stored information to the device status exchange server 114, which is received and determined to be an update to the information. The updates to information may be sent by a server that previously sent the information. Additionally, as mentioned above, a third party server may allow other servers to send updates to the information previously sent by the third party server. For example, the device status exchange server 114 may receive authorization from the third party server permitting one or more other third party servers to update information previously sent by the third party server. In response, the device status exchange server 114 grants these one or more other third party servers permission to update this previously sent information. In such cases, these one or more other third party servers may send updates to information that they had not previously sent.

In response to detecting the update, the device status exchange server 114, at 610, updates the associated profile. That is, the device status exchange server 114 updates the information in the corresponding profile (i.e. the profile associated with the mobile communication device associated with the updated information) to which the updated information pertains to.

As mentioned above, updating may at least include writing, deleting and/or modifying the information. As such, the device status exchange server 114 may add new information, delete some or all of the information and/or change the information within a profile. Such updating of the information may be provided by the server that originally sent the information.

Additionally, in at least some example embodiments, the updating of the information may be provided by a server that did not originally send the information (i.e. another server is authorized to update the information). In such cases, the type of updating is based on the authorization granted to the server. That is, the device status exchange server 114 may accordingly update the information based on the authorization granted to the server.

In such example embodiments, prior to updating, the device status exchange server 114 may analyze the authorization granted to the server, and determine whether the server is permitted to perform such an update. If it is determined that server is authorized to perform the update, the information is accordingly updated. However, it is determined that the server is not authorized to perform the update, the information is not updated. For example, if the authorization permits deleting information, and the server sends an update to delete information, the device status exchange server 114 accordingly deletes the information to update the profile. On the other hand, if the server is not permitted from deleting information (and may or may not be permitted from writing and/or modifying the information), and the server sends an update to delete information, the device status exchange server 114 does not delete the information. As such, the profile is not updated as the server is not authorized to update the profile in the specified manner.

Additionally, the device status exchange server 114, at 612, notifies the third party servers of the update based on the subscription requests. That is, the device status exchange server 114 determines the servers that requested to be notified of the particular update in the information, and subsequently notifies each of these servers of the update. As such, servers are only notified if the update in the information is relevant to them. Generally, in cases where a third party server provides the update, the third party server will not be informed of the update (as the third party server is already aware of the update). However, in cases where the third party server did not provide the update (for example, when the update is provided by a third party server that previously did not send the stored information), the third party server is informed of the update (provided that the subscription request indicates to be notified). By way of example, in some embodiments, at least some of the information stored in the profiles may have been received from a first one of the third party servers. An update in that information may be detected when a second one of the third party servers sends updated information to the device status exchange server 114. Upon detecting such an update, the first third party server may be notified.

Since the notification is performed in accordance with the subscription requests, the servers that are notified of an update are servers who have indicated that the updated information will be relevant to them. More particularly, the subscription request for a third party server may identify one or more types of information (e.g. specific field(s) of the profile) which is relevant to the third party server and/or may identify one or more mobile communication devices that are relevant to the third party server. In such embodiments, prior to notifying a third party server, the device status exchange server 114 uses the subscription request to determine whether the updated information is relevant to the third party server (i.e. whether the updated information is of the type that is relevant to the server) and/or whether the updated information is associated with a mobile communication device that is relevant to the third party server. The update information is only sent to the third party server if the third party server would like to be notified of the update.

While the present disclosure is primarily described in terms of methods, a person of ordinary skill in the art will understand that the present disclosure is also directed to various apparatus, such as a server and/or an electronic device, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, and articles of manufacture also come within the scope of the present disclosure.

While the methods have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method, performed on a device status exchange server, the method comprising:
    storing a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server, at least some of the information stored in the profiles being received from a first one of plurality of third party servers;
    receiving, from one or more of the third party servers, one or more subscription requests for notification of an update in information associated with one of the mobile communication devices;
    registering the one or more received subscription requests for the one or more third party servers;
    receiving authorization, from the first one of the third party servers, permitting a second one of the third party servers to update the stored information received from the first one of the plurality of third party servers;
    in response to receiving the authorization, granting the second one of the third party servers permission to update the stored information;
    after receiving the authorization, detecting an update to the information stored in one of the profiles and received from the first one of the plurality of third party servers based on information received from the second one of the third party servers; and
    in response to detecting the update:
        updating the profile associated with the mobile communication device associated with the updated information; and
        notifying one or more of the third party servers of the update in accordance with one or more registered subscription requests including notifying the first one of the third party servers.

2. The method of claim 1, wherein the authorization is to read, write, delete or modify information to update the stored information.

3. The method of claim 1, wherein at least some of the stored information previously received from the first one of the third party servers is not accessible by one of the other third party servers.

4. The method of claim 1, wherein the subscription request identifies one or more types of information relevant to the third party server and wherein notifying one or more of the third party servers of the update in accordance with one or more registered subscription requests comprises determining whether updated information is relevant to the third party server.

5. The method claim 1, wherein the subscription request identifies one or more of the mobile communication devices relevant to the third party server and wherein notifying one or more of the third party servers of the update in accordance with one or more registered subscription requests comprises determining whether the updated information is associated with a mobile communication device that is relevant to the third party server.

6. The method of claim 1, wherein notifying includes notifying the one or more third party servers of the information prior to being updated, and of the update in the information.

7. The method of claim 1, wherein the information received from the first one of the third party servers includes one or more identifiers associated with one of the mobile communication devices, and wherein the one or more identifiers include one or more of a phone number, a unique equipment identifier, a unique serial number or an international mobile subscriber identity, associated with the mobile communication device.

8. The method of claim 1, wherein the information received from the first one of the third party servers includes an operating state of one of the mobile communication devices, and wherein the operating state includes a currently unlocked state, locked state, cancelled state or suspended state of the mobile communication device.

9. The method of claim 1, wherein the information received from the first one of the third party servers includes credit history information associated with one of the profiles.

10. The method of claim 1, wherein the information received from the first one of the third party servers includes a lost status or stolen status of one of the mobile communication devices based on the mobile communication device being listed on an Equipment Identity Register.

11. The method of claim 1, wherein the information received from the first one of the third party servers includes a lost status or stolen status of a subscriber identity module associated with one of the mobile communication devices.

12. The method of claim 1, wherein the information received from the first one of the third party servers includes one or more physical characteristics associated with one of the mobile communication devices.

13. A device status exchange server comprising:
   a communication subsystem;
   a memory; and
   a processor coupled to the communication subsystem and the memory, the processor configured to:
      store a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server, at least some of the information stored in the profiles being received from a first one of plurality of third party servers;
      receive, from one or more of the third party servers, one or more subscription requests for notification of an update in information associated with one of the mobile communication devices;
      register the one or more received subscription requests for the one or more third party servers;
      receive authorization, from the first one of the third party servers, permitting a second one of the third party servers to update the stored information received from the first one of the plurality of third party servers;
      in response to receiving the authorization, grant the second one of the third party servers permission to update the stored information;
      after receiving the authorization, detect an update to the information stored in one of the profiles and received from the first one of the plurality of third party servers based on information received from the second one of the third party servers; and
      in response to detecting the update:
         update the profile associated with the mobile communication device associated with the updated information; and
         notify one or more of the third party servers of the update in accordance with one or more registered subscription requests including notifying the first one of the third party servers.

14. A non-transitory computer readable storage medium comprising computer executable instructions which, when executed, configure a device status exchange server to:
   store a plurality of profiles associated with a plurality of mobile communication devices, at least some of the mobile communication devices being serviced by a wireless service provider having a wireless service provider server which tracks information about the mobile communication devices serviced by the wireless service provider, the plurality of profiles storing information associated with the mobile communication devices including at least some of the information tracked by the wireless service provider server, at least some of the information stored in the profiles being received from a first one of plurality of third party servers;
   receive, from one or more third party servers, one or more subscription requests for notification of an update in information associated with one of the mobile communication devices;
   register the one or more received subscription requests for the one or more third party servers;
   receive authorization, from the first one of the third party servers, permitting a second one of the third party servers to update the stored information received from the first one of the plurality of third party servers;
   in response to receiving the authorization, grant the second one of the third party servers permission to update the stored information;
   after receiving the authorization, detect an update to the information stored in one of the profiles and received from the first one of the plurality of third party servers based on information received from the second one of the third party servers; and
   in response to detecting the update:
      update the profile associated with the mobile communication device associated with the updated information; and
      notify one or more of the third party servers of the update in accordance with one or more registered subscription requests including notifying the first one of the third party servers.

* * * * *